United States Patent [19]

Yamada et al.

[11] Patent Number: 5,153,485
[45] Date of Patent: Oct. 6, 1992

[54] BIAXIAL ROTARY DRIVE UNIT

[75] Inventors: Takahiro Yamada, Ichikawa; Katsuo Suzuki, Tokyo, both of Japan

[73] Assignee: Kabushiki Kaisha Shinsangyo Kaihatsu, Tokyo, Japan

[21] Appl. No.: 630,185

[22] Filed: Dec. 19, 1990

[30] Foreign Application Priority Data

Dec. 28, 1989 [JP] Japan .................................. 1-343666

[51] Int. Cl.$^5$ .............................................. H02P 1/54
[52] U.S. Cl. ........................................ 318/35; 318/51;
 318/625; 342/359; 343/713; 343/766
[58] Field of Search ............... 318/560, 561, 590, 592,
 318/625, 649, 34, 35, 37, 45–46, 49–50, 66–67;
 343/711, 713–715, 757–759, 763, 765, 766 W,
 883, 882; 342/359

[56] References Cited

U.S. PATENT DOCUMENTS

| | | | |
|---|---|---|---|
| 3,707,721 | 12/1972 | McCartney | 343/759 |
| 4,035,805 | 7/1977 | Mobley | 318/649 |
| 4,156,241 | 5/1979 | Mobley et al. | 343/649 X |
| 4,266,179 | 5/1981 | Hamm, Jr. | 322/2 R |
| 4,691,207 | 9/1987 | Timineri | 343/882 X |
| 4,725,843 | 2/1988 | Suzuki et al. | 342/359 |
| 4,873,526 | 10/1989 | Katsuo | 318/649 X |
| 4,888,539 | 12/1989 | Estabrook et al. | 318/685 X |
| 5,009,115 | 4/1991 | Ringot et al. | 343/766 X |

Primary Examiner—William M. Shoop, Jr.
Assistant Examiner—David Martin
Attorney, Agent, or Firm—Banner, Birch, McKie & Beckett

[57] ABSTRACT

A biaxial rotary drive unit drives an antenna Ant on a vehicle for rotation in both azimuthal and elevational directions. A first axis Y represents a vertical axis, and an azimuth turntable 120 is rotatable about the first axis. The second axis X represents a horizontal axis, and the antenna Ant is mounted on the turntable so as to be rotatable about the second axis in the elevational direction. The turntable 120 represents a gear of an increased diameter, which is meshed by a gear 144 of a reduced diameter to be driven thereby for rotation. A cylindrical shaft 116 extends through the center of the larger diameter gear 120. The cylindrical shaft 116 carries a ring gear meshing with a pinion gear 154, which serves driving the cylindrical shaft 116 up and down. The vertical movement of the cylindrical shaft 116 is transmitted through a link 115 to drive the antenna Ant for rotation in the elevational direction. The cylindrical shaft 116 is formed with a flute 116r extending parallel to the first axis Y and in which a rib 120r on the azimuth turntable 120 is fitted, whereby the cylindrical shaft 116 and the link 115 rotates with the azimuth turntable 120.

6 Claims, 3 Drawing Sheets

BIAXIAL ROTARY DRIVE UNIT

FIELD OF THE INVENTION

The invention relates to a unit which is adapted to drive an object for rotation about a first axis and also about a second axis which is substantially perpendicular to the first axis, and while not intended to be limited thereto, in particular, to an antenna attitude control apparatus which rotationally drives an antenna in the azimuthal and elevational directions.

BACKGROUND OF THE INVENTION

A high gain antenna which is mounted onboard an automobile for the reception of a satellite broadcasting, for example, is supported by a biaxial rotary drive unit. As illustrated, for example, in U.S. Pat. No. 4,725,843 issued to Katsuo Suzuki, and Japanese Laid-Open Patent Applications No. 260,204/1985 and No. 224,703/1986, such biaxial rotary drive unit generally comprises a first rotary drive system which provides a rotary drive in the elevational (or azimuthal) direction, for example, while supporting an antenna mount, and a second rotary drive system which supports the first rotary drive system and which provides a rotary drive in the azimuthal (or elevational) direction.

Considering an antenna drive unit of Az/El (azimuthal/elevational) mount type as disclosed in the cited patent and patent applications, the first rotary drive system which supports an antenna is constructed as an elevational drive mechanism (including motor) and is disposed on a turntable which is in turn supported by a second rotary drive system, constructed as an azimuthal drive mechanism. Accordingly, when the antenna is to be turned continuously in the azimuthal direction, there must be provided some electrical connection means such as slip rings for feeding power to the motor in the first drive system and for transmitting signals between the antenna and stationary electrical circuits. It will be seen that a set of sliding electrical connection means must be provided to feed power to the first rotary drive system; a second set must be provided for transmitting signals received by the antenna, and a third set must be provided for transmitting signals from position sensors associated with the first rotary system, thus requiring a total of three sets of sliding connection means. However, it will be understood that such sliding contact means are subject to a problem of a poor electrical contact caused by oscillations or abrasion.

Since the first rotary drive system which is relatively massive and including a motor, a reduction gearing or the like is disposed on the turntable, the second rotary drive system which must drive the turntable for rotation is required to supply a high output torque. This means that the object which is supported by the second rotary drive system, namely, the antenna in combination with the first rotary drive system, exhibits an increased magnitude of the force of inertia, making it difficult to achieve a rapid rotational positioning control with a high accuracy.

SUMMARY OF THE INVENTION

The invention has for its first object the reduction of inertial force of an object carried by the second rotary drive system, and has for its second object the reduction of the number of sliding electrical connection means which must be provided.

According to the invention, there is provided a biaxial rotary drive unit comprising a support base (130); a rotatable member (120) supported by the support base (130) for rotation about a first axis (Y) and having a guide opening (120h) formed therein which is centered about the first axis (Y) and extending therealong; first drive means (144, 140, 141) for driving the rotatable member (120) for rotation about the first axis (Y); a driven member (110, Ant) carried by the rotatable member (120) for rotation about a second axis (X) which extends substantially perpendicular to the first axis (Y); a reciprocable member (116) extending through the guide opening (120h) of the rotatable member (120) so as to be capable of reciprocating movement therein in the direction of the first axis (Y) and carrying a plurality of ring gears (116a) around its outer surface which are distributed along the first axis (Y) and forming together a ring perpendicular to the first axis (Y) and coupled to the rotatable member (120) for rotation about the first axis (Y); a rotatable drive gear (154) meshing with the ring gears (116a) for rotation about an axis which is perpendicular to the first axis (Y); second drive means (150, 151) for driving the drive gear (154) for rotation; and connection means (115) for connecting the driven member (110, Ant) at a location remote from the second axis (X) with the reciprocable member (116), whereby the reciprocating movement of the reciprocable member (116) is effective to bring forth a rotation of the driven member (110, Ant) about the second axis (X).

It is to be understood that the numerals and the characters appearing in the preceding parentheses represent reference characters used to designate parts which form an embodiment to be described later with reference to the drawings.

In this arrangement, the respective teeth of the ring gears (116a) on the reciprocable member (116) move around it and define a ring which is perpendicular to the first axis (Y), whereby the reciprocable member (116) is capable of rotation about the first axis (Y) relative to the drive gear (154). Accordingly, as the first drive means (144, 140, 141) drives the rotatable member (120) for rotation about the first axis (Y), the reciprocable member (116) also rotates together with the rotatable member (120).

When the first drive means (144, 140, 141) drives the rotatable member (120) for rotation, the driven member (110, Ant) rotates about the first axis (Y). When the second drive means (150, 151) drives the drive gear (154) for rotation, the reciprocable member (116) moves along the first axis (Y), whereby the driven member (110, Ant) rotates about the second axis (X).

As mentioned, the second drive means (150, 151) drives the drive gear (154) for rotation, but the reciprocable member (116) which is reciprocatingly driven by the drive gear (154) slides with respect to the rotatable member (120), so that the rotatable member (120) and the first drive means (144, 140, 141) which drives it for rotation are not driven by the second drive means (150, 151) and thus avoid loading upon it. This means that the object which is substantially carried by the second drive means (150, 151) comprises the driven member (110, Ant), the connection means (115) and the reciprocable member (116), the combined inertial force of which is reduced, thus enabling the rotational positioning of the driven member (110, Ant) about the second axis (X) to be achieved rapidly and with a high accuracy.

In addition, the first drive means (144, 140, 141) does not support the second drive means (150, 151), and in turn the second drive means (150, 151) does not support the first drive means (144, 140, 141). Thus, the first drive means (144, 140, 141) and the second drive means (150, 151) are both fixedly mounted, and thus the power can be fed thereto through stationary connection means, thus dispensing with sliding electrical connection means for purpose of feeding power thereto.

Other objects and features of the invention will become apparent from the following description of an embodiment thereof with reference to the drawings.

DESCRIPTION OF PREFERRED EMBODIMENTS

Figure 1:
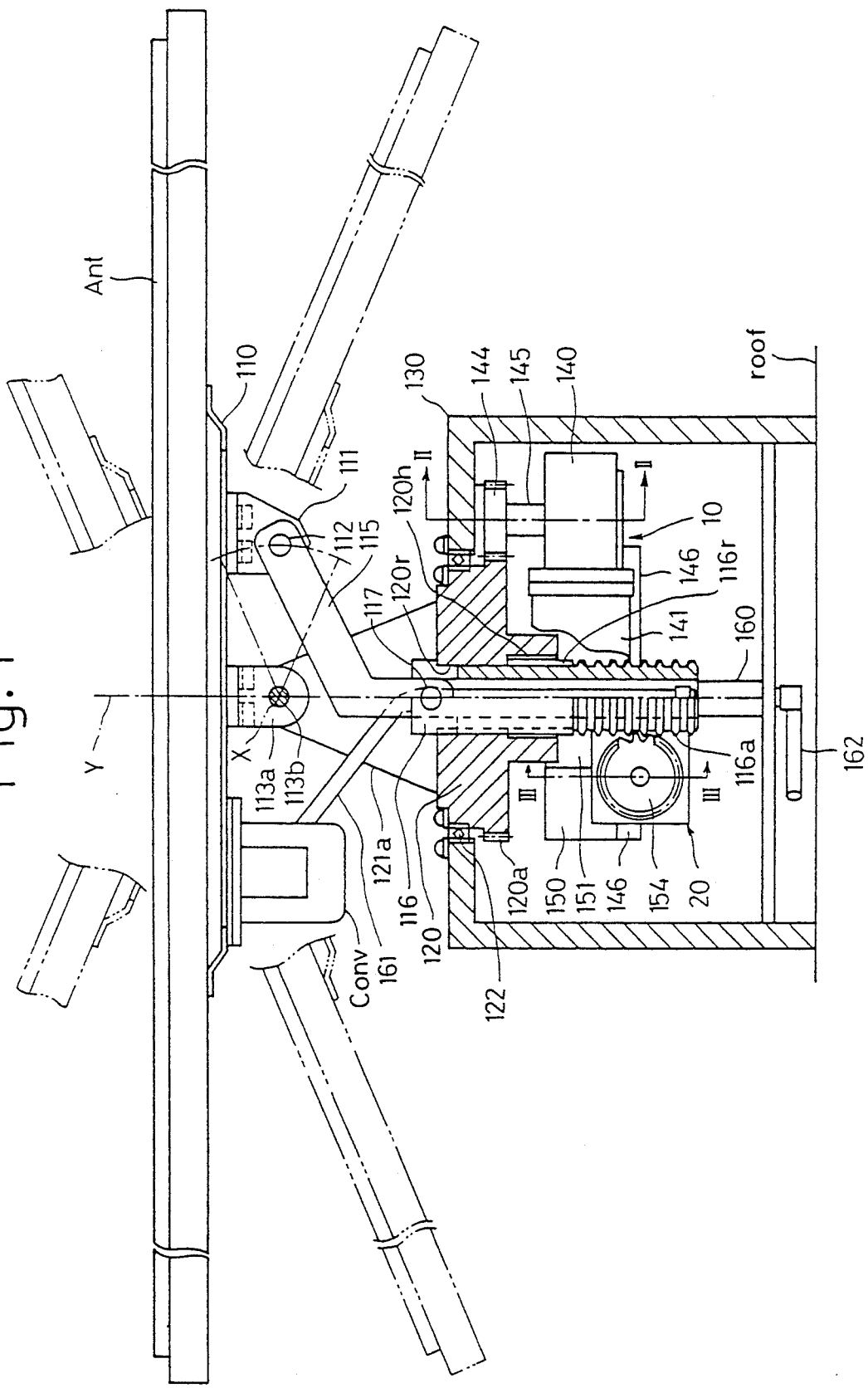
FIG. 1 is a longitudinal section of one embodiment of the invention.

FIG. 1 shows one embodiment of the invention. The embodiment represents a biaxial rotary drive unit which drives an antenna Ant, mounted on the roof of an automobile for receiving a satellite broadcasting, for rotation in the azimuthal direction or about a first axis Y and also in the elevational direction or about a second axis X.

The antenna Ant comprises a beam antenna in the form of a flat plate, and is secured to an antenna bracket 110. The bracket 110 includes an angle 113a having a horizontal shaft 113b (the center of which defines the second axis X) secured thereto. As shown, the horizontal shaft 113b extends in a direction into and out of the plane of the drawing, and has its one end rotatably carried by a bearing, not shown, which is mounted on a support arm 121a, which is in turn fixedly mounted on a turntable 120. The other end of the shaft 113b is also rotatably carried by a bearing, also not shown, which is again supported by another support arm similar to the support arm 121a. The other support arm, not shown, is fixedly mounted on the turntable 120 at a position which is symmetrical to the support arm 121a with respect to a cylindrical shaft 116, to be described later.

The turntable 120 is essentially a disc-shaped spur gear, having a guide opening 120h formed centrally therein and carrying a gear 120a around its lateral side. The turntable is rotatably mounted on a stationary base 130 by means of a bearing 122 so as to be capable of rotation about the central axis of rotation of the gear 120a or the first axis Y. The gear 120a meshes with a gear 144, which is driven for rotation by a motor 141 through a gear shaft 145 and a reduction gearing 140. Both the reduction gearing 140 and the motor 141 are fixedly mounted on a support plate 146 which is secured to the stationary base 130.

Figure 2:
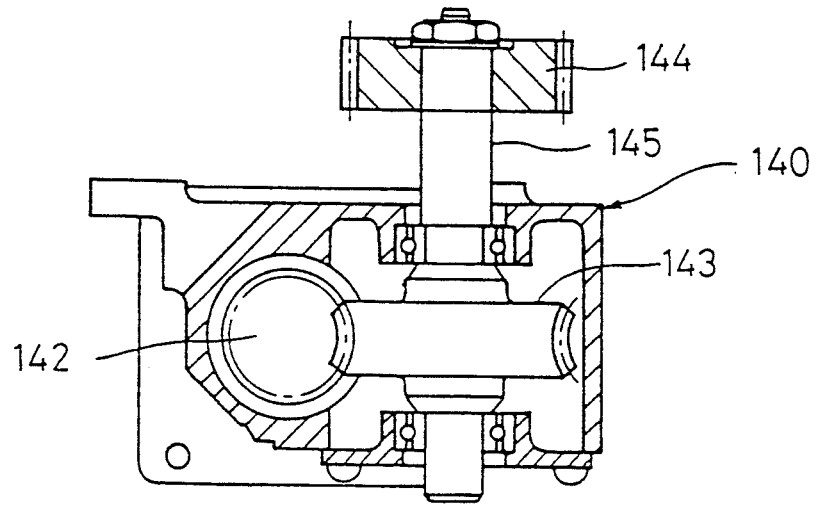
FIG. 2 is an enlarged cross section taken along the line II—II shown in FIG. 1.

Referring to FIG. 2 which shows an enlarged cross section taken along the line II—II shown in FIG. 1, it will be seen that the reduction gearing 140 internally houses a worm wheel 143 which is fixedly mounted on the gear shaft 145 and which meshes with a worm 142 which is in turn mechanically coupled to the rotary shaft of the motor 141 (FIG. 1). When the motor 141 rotates in the forward direction, the gear 144 rotates in one direction to cause the turntable 120 to rotate in one direction about the first axis Y. Specifically, the antenna Ant will rotate in a forward direction about the first axis Y. For a reverse rotation of the motor 141, the antenna Ant will rotate in a reverse direction.

The cylindrical shaft 116 extends through the guide opening 120h formed in the turntable 120, and is movable with respect thereto in the direction of the first axis Y. The peripheral surface of the shaft 116 is formed with a flute 110r which extends parallel to the first axis Y, and a rail-shaped rib 120r extending parallel to the first axis Y projects from the wall of the guide opening 120h to be fitted in the flute 110r. As a consequence, the cylindrical shaft 116 is capable of moving in the direction of the first axis Y with respect to the turntable 120, but is incapable of rotation about the first axis Y. Accordingly, when the turntable 120 rotates about the first axis Y, the cylindrical shaft 116 also rotates about the first axis Y.

At its upper end, the cylindrical shaft 116 fixedly carries a pin 117, which is swingably engaged by the lower end of a link arm 115. The upper end of the arm 115 is also swingably engaged with a pin 112 which is fixedly mounted on an angle 111 secured to the bracket 110.

Since the bracket 110 is spaced in the horizontal plane from the angle 113a in a direction perpendicular to the direction in which the horizontal shaft 113b extends or the direction perpendicular to the plane of FIG. 1, it will be seen that as the cylindrical shaft 116 moves upward, as viewed in FIG. 1, the antenna Ant will rotate counter-clockwise about the horizontal shaft 113b. Conversely, as the cylindrical shaft 116 moves down, the antenna Ant will rotate clockwise.

On its lower half, the peripheral surface of the cylindrical shaft 116 is formed with a series of ring-shaped, rather than helical, gears 116a. Each gear 116a, or more specifically, the peak and the valley thereof, is in the plane which is perpendicular to the first axis Y. The ring-shaped gears 116a mesh with a gear 154.

Figure 3:
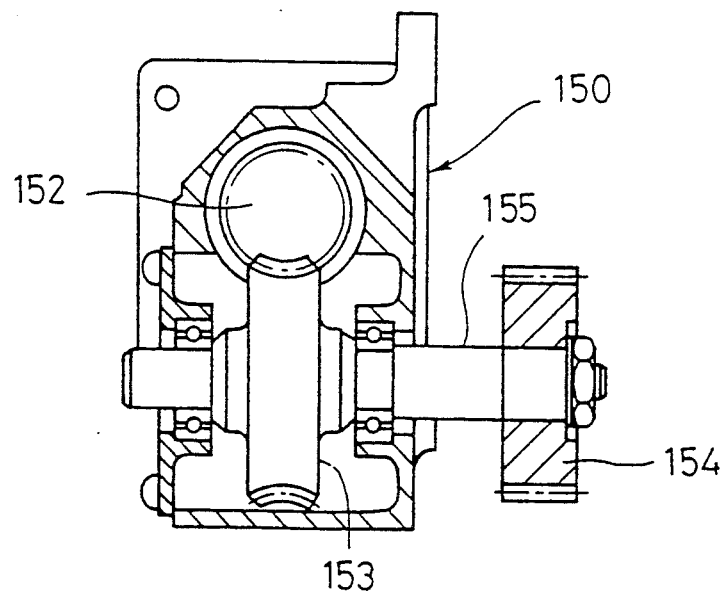
FIG. 3 is an enlarged cross section taken along the line III—III shown in FIG. 1.

Also referring to FIG. 3 which shows an enlarged cross section taken along the line III—III shown in FIG. 1, it will be seen that the gear 154 has a gear shaft 155, on which the worm wheel 153 of a reduction gearing 150 is fixedly mounted. A worm 152 meshes with the worm wheel 153 and is mechanically coupled to the rotary shaft of a motor 151 (FIG. 1). Both the reduction gearing 150 and the motor 151 are fixedly mounted on the support plate 146 secured to the stationary base 130. When the motor 151 rotates in the forward direction, the gear 154 rotates clockwise, as viewed in FIG. 1, whereby the cylindrical shaft 116 moves downward, causing the antenna Ant to rotate clockwise. For a reverse rotation of the motor 151, the antenna Ant rotates counter-clockwise.

Figure 4:
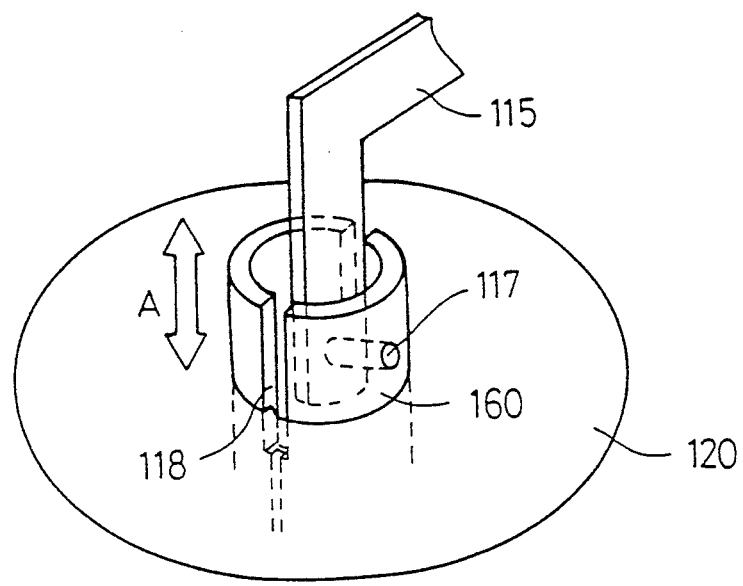
FIG. 4 is a perspective view, to an enlarged scale, of an upper end of a cylindrical shaft 116 shown in FIG. 1.
Figure 5:
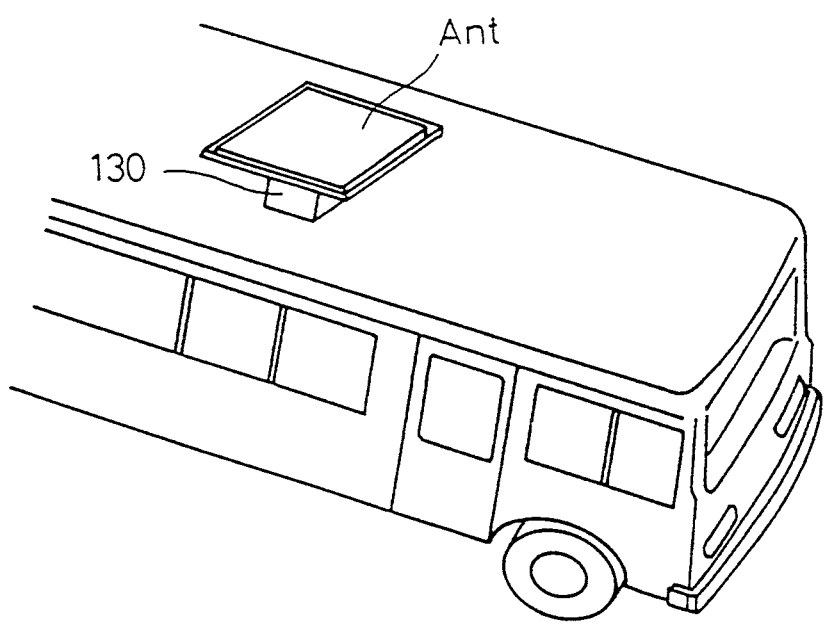
FIG. 5 is a perspective view of a rear portion of a vehicle on which the antenna system shown in FIG. 1 is mounted.

As the cylindrical shaft 116 moves up and down, a force will be imparted to rotate the link arm 115 about the pin 117, and thus the link arm 115 moves angularly about the pin 117. To avoid an interference with such angular movement of the link arm 115, the upper end of the cylindrical shaft 116 is formed with splined grooves 118, as shown in FIG. 4.

Although the gears 116a on the cylindrical shaft 116 mesh with the gear 154, it is to be noted that the peak and the valley of the gear 116 each form a ring extending around the peripheral surface of the cylindrical shaft 116 while being located parallel to the first axis Y, so that the rotation of the cylindrical shaft 116 is not constrained by the gear 154, but is freely rotatable about the first axis Y without causing such rotation itself to cause a vertical movement of the cylindrical shaft 116 with respect to the gear 154 independently from whether the gear 154 remains at rest or is rotating. If the gears 116a were formed to extend helically around the cylindrical shaft 116, the rotation of the cylindrical shaft 116 when the gear 154 remains at rest will cause it to move up or down, and the rotation about the first axis Y will result in a rotation about the horizontal shaft 113b, causing a disturbance to the setting of an angular position about the horizontal shaft 113b which is made by utilizing the motor 151. However, in the present embodiment, the gears 116a are ring-shaped, precluding such disturbance from occurring.

As mentioned above, the reduction gearing 140 and the motor 141 which are used to drive the antenna Ant for rotation about the first axis Y, and the reduction gearing 150 and the motor 151 which are used to drive the antenna Ant for rotation about the horizontal shaft 113b or the second axis X which is perpendicular to the first axis Y are both fixedly mounted on the stationary base 130, and hence there is no need for the provision of sliding contact means in order to feed these motors 141, 151.

A converter Conv is mounted on the bracket 110, converting a radio wave from the satellite broadcasting in 12 GHz band which is received by the antenna Ant into BS-IF in 1 GHz band. The converted signal is transmitted through a cable 161 to a rotary joint 160.

It will be noted that the converter Conv which is fixedly mounted on the bracket 110 will rotate about the first axis Y and the horizontal shaft 113b together with the antenna Ant, and accordingly the signal line and the feeding line from the converter Conv must be connected with a corresponding signal line and feeding line of associated electrical circuits, not shown, which are provided on a stationary part through sliding connection means.

In the present embodiment, in view of the fact that the antenna Ant rotates about the horizontal shaft 113b in the elevational direction through a range of angle less than 360°, a relatively flexible cable having an excessive length is used for the electrical cable 161, which acts as both the signal line and the feeding line for the converter Conv, and is passed through an internal bore inside the cylindrical shaft 116 for connection with the rotary joint 160. An electrical cable 162 from a stationary electrical circuit, not shown, is also connected to the rotary joint 160, whereby the lead wires in the cables 161 and 162 which are to be electrically connected together can be maintained in electrical connection despite any relative rotation about the first axis Y. The cable 161 then will behave as a shaking motion about the pin 117 for the rotation of the antenna Ant about the horizontal shaft 113b. In this manner, only one set of sliding connection means, namely, the rotary joint 160, is used in the present embodiment.

The cable 162 is connected to a BS tuner, not shown, which is disposed within a compartment of the automobile, thus transmitting a satellite broadcasting signal to the compartment. While not shown, motor drivers which feed electrical currents to the motors 141 and 151 to energize them for rotation in the forward or reverse rotation are housed within the stationary base 130, and control signal lines connected with these motor drivers are connected to an antenna attitude control system, not shown, which is disposed within the compartment. The antenna attitude control system determines if the attitude of the antenna is proper on the basis of a received signal from the antenna Ant and gyro data, and delivers command signals which direct the motor drivers for rotation in the forward or reverse direction so as to bring the directivity of the antenna Ant into alignment with the broadcasting satellite if the present attitude is improper.

In the described embodiment, the horizontal shaft 113b is disposed directly above the cylindrical shaft 116, but the horizontal shaft 113b may be displaced to the left or right as viewed in FIG. 1.

In the present embodiment, the driven member comprises the beam antenna Ant in the form of a flat plate, but it may also comprise a parabolic antenna. In addition, the antenna described may be replaced by any other object which is to be driven for rotation about two or more axes.

As described, according to the invention, the second drive means (150, 151) drives the drive gear (154) for rotation, but the reciprocable member (116) which is reciprocatingly driven by the drive gear (154) slides with respect to the rotatable member (120), and hence the rotatable member (120) and the first drive means (144, 140, 141) which drives it for rotation are not driven by the second drive means (150, 151), thus preventing them from loading upon the latter. Accordingly, the object which is substantially carried by the second drive means (150, 151) comprises the driven member (110, Ant), the connection means (115) and the reciprocable member (116), the combined inertial force of which is reduced, so that the rotational positioning of the driven member (110, Ant) about the second axis (X) can be achieved rapidly and with a high accuracy.

Since the first drive means (144, 140, 141) does not support the second drive means (150, 151) and the second drive means (150, 151) does not support the first drive means (144, 140, 141), but both of them are fixedly mounted, they may be fed through stationary connection means, thus dispensing with sliding connection means in order to feed them.

While the invention has been described above in connection with the particular embodiment thereof, it should be understood that a number of changes, modifications and substitutions therein will readily occur to those skilled in the art in the light of above teachings. Accordingly, the scope of the invention is not limited to the specific embodiment shown and described, but should be solely defined by the appended claims.

What is claimed is:

1. A biaxial rotary drive unit comprising
  a support base;
  a rotatable member carried by the support base for rotation about a first axis and including a guide opening formed therein which is centered about the first axis and extending therealong;
  first drive means for driving the rotatable member for rotation about the first axis;
  a driven member carried by the rotatable member for rotation about a second axis which extends substantially perpendicular to the first axis;
  a reciprocable member extending through the guide opening in the rotatable member so as to be guided for reciprocating movement along the first axis and carrying a plurality of ring gears around its outer surface completely extending therearound and which are distributed in the direction of the first axis and forming rings perpendicular to the first axis and coupled to the rotatable member for rotation about the first axis;

a drive gear meshing with the ring gears for rotation about the axis which is perpendicular to the first axis;

second drive means mounted to said support base separate from said rotatable member for rotatable driving the drive gear;

and connection means for connection to the driven member at a location remote from the second axis, and the reciprocable member, so that the reciprocating movement of the reciprocable member is effective to cause a rotation of the driven member about the second axis.

2. A biaxial rotary drive unit according to claim 1 in which one of the rotatable member and reciprocable member is formed with a flute extending parallel to the first axis while the other is formed with a rib which is fitted in the flute.

3. A biaxial rotary drive unit according to claim 2 in which the rotatable member comprises a gear of a larger diameter for rotation about the first axis, and the first drive means comprises a gear of a reduced diameter which meshes with the gear of a larger diameter, a reduction gearing having its output shaft coupled to the gear of a reduced diameter, and an electrical motor coupled to the input shaft of the reduction gearing.

4. A biaxial rotary drive unit according to claim 1 in which the connection means comprises a link having its one end supported by one end of the reciprocable member so as to be swingable about a third axis which is parallel to the second axis and having its other end coupled to the driven member so as to be swingable about a fourth axis which is parallel to the second axis.

5. A biaxial rotary drive unit according to claim 4 in which the second and the third axis intersect with the first axis and are perpendicular thereto while the fourth axis is located remote from the first axis, the link including a first portion extending from the third axis toward the second axis in a direction parallel to the first axis, and the second portion continuing from the first portion and extending to the fourth axis at an angle with respect to the first axis.

6. A biaxial rotary drive unit comprising a support base;

a rotatable member carried by the support base for rotation about a first axis and including a guide opening formed therein which is centered about the first axis and extending therealong;

first drive means for driving the rotatable member for rotation about the first axis;

a driven member carried by the rotatable member for rotation about a second axis which extends substantially perpendicular to the first axis;

a reciprocable member extending through the guide opening in the rotatable member so as to be guided for reciprocating movement along the first axis and carrying thereon gear means for effecting said reciprocating movement;

a drive gear meshing with the gear means;

second drive means mounted to said support base separate from said rotatable member for rotatably driving the drive gear; and connection means for connection to the driven member at a location remote from the second axis, and the reciprocable member, so that the reciprocating movement of the reciprocable member is effective to cause a rotation of the driven member about the second axis.

* * * * *